Patented Jan. 13, 1953

2,625,550

UNITED STATES PATENT OFFICE 2,625,550

THIOPHENE AMINES

John W. Schick, Camden, and Howard D. Hartough, Pitman, N. J., assignors to Socony-Vacuum Oil Company, Incorporated, a corporation of New York No Drawing. Application October 23, 1947, Serial No. 781,754

7 Claims. (Cl. 260—329)

The present invention relates to the condensation of substances having at least one hydrogen atom of pronounced activity and hydrohalides of ammonia and substituted ammonia by means of a highly reactive aldehyde and, more particularly, to the condensation of substances having at least one hydrogen atom of pronounced activity with hydrohalides of ammonia, alkyl substituted ammonia and hydroxyl substituted ammonia by means of a highly reactive aldehyde in the presence of an acid having an ionization constant above $1 \times 10^{-5}$.

In an application for United States Letters Patent Serial No. 636,511, filed December 21, 1945, now abandoned, in favor of application Serial No. 204,264, filed January 3, 1951, now U. S. Patent No. 2,612,505, Howard D. Hartough and Sigmund J. Lukasiewicz described the condensation of thiophene and derivatives of thiophene having stable electropositive substituent groups attached to the thiophene nucleus with salts of ammonia, salts of mono- and dialkyl substituted ammonia, salts of alkyl polyamines, aryl polyamines, urea and aniline in the presence of formaldehyde or its polymers. These investigators disclosed in the aforesaid application for United States Letters Patent that primary amines, secondary amines and sub-resinous bodies of the nature of a tertiary amine can be obtained. These investigators also showed that the proportion of each of these products in the final product can be controlled by controlling the mole ratio of the reactants. For example, it was established that the amount of sub-resinous bodies in the reaction product can be kept at a minimum by using an excess of thiophene and/or ammonium halide. It was also established that variation of the molar ratio of the reactants causes a variation in the molecular weight of the sub-resinous body as well as the proportion of sub-resinous body to the primary and secondary amines in the reaction product. For example, when the reactants, thiophene, formaldehyde and ammonium halide are reacted in the molar proportion of 1.2:1:1, respectively, the molecular weight of the benzene soluble sub-resinous body is of the order of 637. When the molar proportion of these reactants is 1:2:1 the molecular weight of the benzene soluble sub-resinous body is of the order of 1137.

It now has been found that substances capable of forming acids having an ionization constant above $1 \times 10^{-5}$ (Lange's Handbook of Chemistry (5th ed.), pages 1397 and 1398) and acids having an ionization constant above $1 \times 10^{-5}$, such as sulfurous acid in the form of acid sulfites, and aqueous solutions of sulfur dioxide, acetic acid, arsenic acid, benzoic acid, haloalkanoic acids, citric acid, formic acid, fumaric acid, phosphoric aid, maleic acid, etc., modify the polymers obtained from the reaction of thiophene, formaldehyde and hydrohalides of ammonia, alkyl substituted ammonia, alkylene diamines such as ethylene diamine and the like, and hydroxyl substituted ammonia such as hydroxylamine in that the polymers are of lower molecular weight and of greatly improved color. In general, when one of the aforesaid modifiers is added to the reaction mixture of thiophene or mono- or di-substituted thiophene having at least one unsubstituted alpha position, formaldehyde and ammonium halide or hydroxylamine halide and the product neutralized, white resins or light colored viscous oils are obtained depending upon whether aqueous formaldehyde or a polymer of formaldehyde is used. This is in direct contrast to the results described in the aforementioned Hartough and Lukasiewicz application Serial No. 636,511. Whereas Hartough and Lukasiewicz obtained sub-resinous, viscous oils by reacting thiophene, ammonium chloride and aqueous formaldehyde in contra-distinction thereto when thiophene, ammonium chloride and aqueous formaldehyde are reacted in the presence of an aforementioned modifier, resinous products are obtained rather than sub-resinous viscous oils. Similarly, whereas Hartough and Lukasiewicz obtained resinous products when reacting thiophene, ammonium chloride and a polymer of formaldehyde (paraformaldehyde), when thiophene ammonium chloride and a polymer of formaldehyde (paraformaldehyde) are reacted in the presence of an aforementioned modifier sub-resinous viscous oils are obtained.

The products of the reaction in the presence of at least a molecular amount of alkali metal acid sulfite before neutralization are crystalline and can be recrystallized from water as crystalline hydrates. The crystalline products readily dissolve in hydrochloric acid to free the anion of the modifier employed in the condensation reaction. When the condensation product produced in the presence of the [HSO₃] group is heated in aqueous solution in the presence of an acid such as hydrochloric acid, sulfur dioxide is evolved. This latter reaction indicates decomposition of a product containing the anion of the modifier; in this instance, $HSO_3$. Addition of sodium acetate or alkali to the aqueous solutions of the crystalline products frees the amines which are white thermoplastic resins partially soluble in benzene or white thermoset resins wholly insoluble in benzene.

Products having satisfactory colors were obtained when the ratio of ammonium halide to soluble bisulfite was as low as 5 moles of ammonium chloride to one mole of sodium bisulfite. The upper limit of the molar ratio appears to approach 1:1.

Indicative of the effect of modifiers of the aforesaid class, it is to be noted that hard resins insoluble in benzene are obtained by reacting one mole of thiophene, 3 moles of paraformaldehyde and one mole of ammonium chloride. In contrast to the foregoing results, the addition of 0.2 to 0.4 mole of sodium bisulfite to the reaction mixture of one mole of thiophene, 3 moles of paraformaldehyde and one mole of ammonium chloride modifies the reaction and viscous oils soluble in benzene are obtained.

More highly polymerized material difficultly soluble in benzene can be obtained by reacting the thiophene, formaldehyde and ammonium halide and introducing the sodium bisulfite dropwise as a 40 per cent by weight aqueous solution. These more highly polymerized materials are of good color.

The foregoing can be generalized to provide the following description of the present invention. Thiophene and thiophene derivatives having at least one unsubstituted nuclear hydrogen atom in the alpha position or, in general, substances having at least one hydrogen atom of pronounced activity, may be reacted with formaldehyde or its polymers and ammonium halides or hydroxylamine halides or hydrohalides of alkyl substituted ammonia hydrohalides of alkylene diamines and the condensation modified by either adding the entire amount of the modifier to the initial reaction mixture or by slowly adding the modifier during the course of the reaction. The products of either operation are useful in moisture-proofing fabric such as those comprised of wool, rayon, cotton and, in general, textile materials including paper, regenerated cellulose, etc. They also may be used as fungicides and bactericides particularly when in combination with phenolic materials as described hereinafter.

Illustrative, but not limiting, of the present invention are the following examples.

*Example I*

A mixture of about 84 parts by weight of thiophene (about one mole), about 100 parts by weight of 37 per cent aqueous formaldehyde (about 1.2 moles), about 27 parts by weight of ammonium chloride (about 0.5 mole) and about 52 parts by weight of sodium bisulfite (about 0.5 mole), i. e. 1.0 mole equivalent of $HSO_3^-$ or 0.5 mole sulfurous acid, was refluxed for about 5 hours. Upon cooling to ambient temperature a crystalline precipitate formed which, when separated and recrystallized from hot water, gave a white crystalline product of the following analysis: sulfur, 18.6 per cent; nitrogen, 4.87 per cent.

A sample of crystalline material from a similar experiment after two recrystallizations from water and drying was refluxed with benzene. The amount of water given off during the refluxing was abnormal and may have been due to the removal of water of hydration. The dried sample was analyzed and found to contain: sulfur, 21.5 per cent; nitrogen, 5.02 per cent.

*Example II*

A mixture of about 168 parts by weight of thiophene (about 2 moles), about 180 parts by weight of paraformaldehyde (trioxymethylene) (about 6 moles), about 108 parts by weight of ammonium chloride (about 2 moles) and about 20 parts by weight of acetic acid (depolymerizer of the trioxymethylene) was heated to about 72 degrees centigrade for about 15 minutes before a reaction set in. The addition of about 104 parts by weight of sodium bisulfite (about one mole), i. e. about one mole sulfurous acid in about 150 parts by weight of water (aqueous about 40 per cent solution) was begun and the reaction temperature maintained below about 75 degrees centigrade by means of an ice bath. The addition of the aqueous solution of sodium bisulfite was completed in about one hour additional time. After neutralization with caustic soda, the product was found to be insoluble in cold benzene but soluble in boiling benzene. Removal of the benzene solvent yielded a thermoplastic resinous product of light red color. The thermoplastic material when analyzed had a sulfur content of 24.1 per cent and a nitrogen content of 8.67 per cent.

The product obtained from the foregoing quantities of these materials in the absence of sodium bisulfite was a deep yellow to red, brittle resin insoluble in benzene.

*Examples III to VI*

These examples are illustrative of the effect of a modifier on the reaction product of the condensation of thiophene, ammonium halide and formaldehyde (trioxymethylene) or paraformaldehyde to produce subresinous products in contrast to the resins produced in the absence of a modifier of the class defined hereinbefore. The reactants in the molal quantities indicated together with sufficient acetic acid to depolymerize the formaldehyde polymer were heated to 68 degrees centigrade, the source of external heat removed and the temperature of the reaction controlled at 75 degrees centigrade by means of an ice bath.

TABLE I

| Example No. | Moles of Reactants | | $NH_4Cl$ | $NaHSO_3$ | Description of Products |
|---|---|---|---|---|---|
| | $C_4H_4S$ | $CH_2O$ [1] | | | |
| III | 2 | 6 | 1.5 | 0.5 | Very fluid light yellow amine. |
| IV | 2 | 6 | 2.0 | 0.5 | More viscous than III.[2] |
| V | 2 | 4 | 2.0 | 0.5 | Light yellow oil about the same as III. |
| VI | 2 | 8 | 2.0 | 0.5 | Very viscous oil, light red color. |

[1] Paraformaldehyde.
[2] Included a small amount of benzene insoluble resin.

The products described in Table I analyzed as indicated:

| Example No. | Percent Wt. S | Percent Wt. N | Hydroxyl Number | Molecular Weight |
|---|---|---|---|---|
| III | 22.0 | 6.64 | 390 | 706 |
| IV | 22.0 | 6.91 | 400 | 521 |
| V | 26.5 | 8.00 | 370 | 416 |

Example VII

A mixture consisting of about 420 parts by weight of thiophene (about 5 moles), about 425 parts by weight of aqueous formaldehyde solution containing about 37 per cent formaldehyde (about 5 moles), about 270 parts by weight of ammonium chloride (about 5 moles) and about 104 parts by weight of sodium bisulfite (about one mole), was refluxed for about 3 hours. The reaction mixture was then steam distilled and 365 parts by weight of thiophene recovered. After cooling, the steam distilled reaction mixture was neutralized with about 6 moles of potassium hydroxide in the form of an aqueous 20 per cent potassium hydroxide solution. The resulting mixture was steam distilled until about 500 parts by weight of distillate were collected. The distillate was extracted with ethyl ether and about 23 parts by weight of a mixture of 2-thenylamine and di-(2-thenyl)amine recovered from the extract. Upon treating the residue of the second steam distillation with benzene about 203 parts by weight of sub-resinous amines were extracted by the benzene. The benzene insoluble material totalled about 80 parts by weight. The benzene insoluble material was dissolved in dilute hydrochloric acid, precipitated with caustic soda, water-washed and dried. The dried material was a light yellow resin.

Example VIII

A mixture of about 756 parts by weight of thiophene (about 9 moles), about 1225 parts by weight of an aqueous solution of formaldehyde containing about 37 per cent formaldehyde (about 15 moles), about 810 parts by weight of ammonium chloride (about 15 moles) and about 624 parts by weight of sodium bisulfite (about 6 moles) was refluxed for 4 hours at about 71 to about 72 degrees centigrade. Crystals began to form after the reaction mixture had been stirred for about 30 minutes. The reaction mixture was distilled and about 300 parts by weight of thiophene recovered. The residue was a pasty mass that solidified completely on cooling. Neutralization of a portion of the residue of the reaction mixture produced a white flocculent resinous mass.

Example IX

A portion of the residue from the reaction mixture described in Example VIII and amounting to about 500 parts by weight was neutralized with caustic and extracted with benzene. All of the neutralized mass, with the exception of about 10 parts by weight, was soluble in the benzene. The benzene-insoluble material was plastic and could be thermoset to a hard white resin by boiling with water. The benzene-insoluble material had a nitrogen content of 13.55 per cent and a sulfur content of 20.9 per cent.

The benzene-soluble portion was distilled and about 9 parts by weight of 2-thenylamine and about 3 parts by weight of di-(2-thenyl)amine were obtained. About 69 parts by weight were recovered as a still residue, viscous at high temperatures, but solid at ambient temperatures. The residue analyzed 10.33 per cent of nitrogen and 24.7 per cent of sulfur.

Example X

A portion of the residue of the reaction mixture obtained in Example VIII totalling about 500 parts by weight was neutralized with an excess of caustic soda and about 100 parts by weight of an aqueous solution containing about 37 per cent formaldehyde were added. A heat of reaction and slow solidification of the oily material was observed. After stirring the mixture for about an hour the resinous material formed into a white mass that had some of the properties of an elastomer. The material was water-washed and benzene added. The material was insoluble in benzene and an extremely stable emulsion of water, benzene and the resinous amine was formed. The emulsion was broken by removing the benzene by evaporation. The benzene-insoluble material analyzed 6.77 per cent nitrogen and 16.4 per cent sulfur.

Example XI

A mixture containing about 756 parts by weight of thiophene (about 9 moles), about 810 parts by weight of ammonium chloride (about 15 moles) and about 312 parts by weight of sodium bisulfite (about 3 moles) was prepared and about 1215 parts by weight of an aqueous solution containing about 36 per cent formaldehyde (about 15 moles) added thereto. The reaction mixture was refluxed at 68 to 70 degrees centigrade for about 2 hours and then distilled. About 370 parts by weight of thiophene and dimethylformal [$(CH_3O)_2CH_2$] were removed as distillate. The still residue was neutralized with caustic soda and steam distilled until about 2000 parts by weight of distillate were obtained. The distillate was saturated with common salt (NaCl) and extracted with ethyl ether whereby about 55 parts by weight of a mixture of 2-thenylamine and di-(2-thenyl)amine was obtained. The residue of the steam distillation totalled about 800 parts by weight and was a light yellow, thermoplastic, benzene-insoluble resin which had a nitrogen content of 8.6 per cent and a sulfur content of 20.9 per cent.

The analyses indicate that sulfur and nitrogen are present in roughly the same atomic proportions, e. g. one atom of nitrogen per atom of sulfur or per thiophene radical. Assuming that 2-thenylformaldimine,

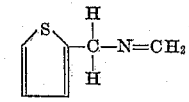

be the basic monomer, there are several possible formulae which may be assigned on this basis to this material; two of these formulae are as follows: "A" in which polymerization takes place through the other alpha position of the thiophene nucleus and "B" in which polymerization takes place through the formaldimine grouping.

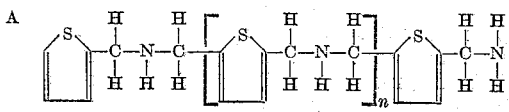

where $n$ is a small integer,

B
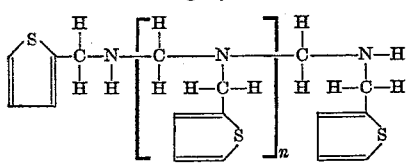

where $n$ is a small integer.

There is evidence that both types of polymerization occur. Thus, when N-(5-methyl-2-thenyl)formaldimine, i. e. a compound in which the other alpha position of the thiophene radical is blocked, is polymerized with aqueous hydrochloric acid, in the manner described hereinafter, a resinous polymer is obtained.

N-(5-methyl-2-thenyl)formaldimine was polymerized by mixing 45.5 parts by weight of the formaldimine, 950 parts by weight of water and about 235 parts by weight of concentrated hydrochloric acid and boiling the mixture until a dark, reddish oil separated. This oil appeared to be a complex hydrochloride of some polymer since it was soluble in alcohol or water. Neutralization of the oil with aqueous caustic yielded a yellow resinous product which was not soluble in common solvents such as acetone and benzene. The yellowish resin can be construed to be a polymer of the original N-(5-methyl-2-thenyl)formaldimine polymerized through the formaldimine grouping. Such a polymer can be represented by the following formula:

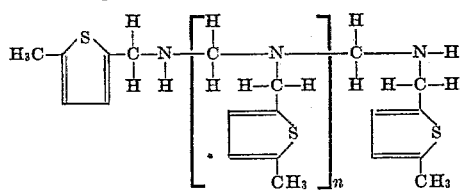

Consequently, when the other alpha position of the thiophene radical is not blocked as in N-(2-thenyl)formaldimine, polymerization may take place either through the other alpha position of the thiophene radical or through the formaldimine grouping or through both.

Treatment of materials having structures which may be represented by either formula "A" or formula "B" with formaldehyde causes further resinification to products which may be represented by formulae "A₁" and "B₁" respectively, A₁
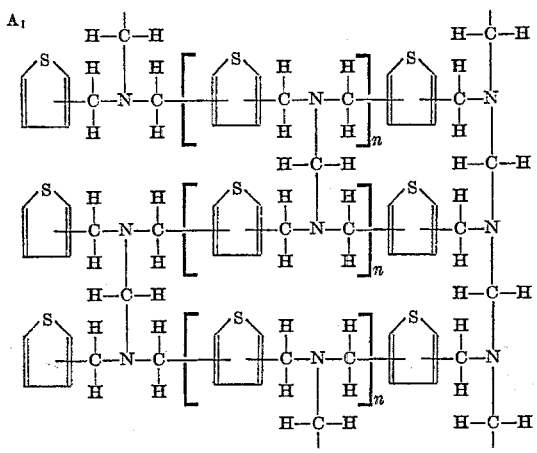

or by several other cross linkage patterns. Treatment of a molecule of the illustrated type with dilute acids should break down the methylene bridges in a manner similar to that which takes place in the decomposition of hexamethylenetetramine to formaldehyde and ammonium chloride in the presence of hydrochloric acid. When the formaldehyde-treated neutralized resinous products produced in the presence of sodium bisulfite are dissolved in dilute hydrochloric acid copious amounts of formaldehyde are given off.

B₁
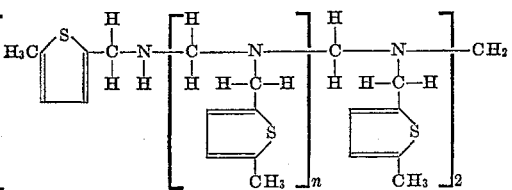

The resinous polymers made from thiophene, paraformaldehyde and ammonium halide described in copending application Serial No. 636,511 appear to function similarly but are more brittle and do not have the plastic properties of the materials obtained from condensation of thiophene and ammonium halide in the presence of aqueous formaldehyde and sodium bisulfite. Furthermore, in the aforesaid application the use of an excess of aqueous formaldehyde was shown to give subresinous oils while the use of paraformaldehyde resulted only in resins. On the other hand, modification of the condensation by the use of sodium bisulfite or other modifiers as defined hereinbefore results in a reversal of the physical form of the condensation products. That is to say, aqueous formaldehyde and bisulfite produce resinous products instead of subresinous products while paraformaldehyde and bisulfite produce subresinous products instead of resinous products.

Advantage can be taken of the presence of loosely bound formaldehyde in the products and the condensation product blended with phenol-aldehyde type resins to "cure" the phenolic type resin and to impart new properties to the finished "Bakelites."

It has also been found that water-soluble resinous materials as the hydrohalide can be obtained when phenol is substituted for say up to 25 per cent of the thiophene in the reaction mixture. At about 50 per cent proportions water-insoluble products result and it is difficult to predict a co-reaction.

In general, thiophene or mono- or di-substituted thiophenes having at least one unsubstituted alpha position in which the substituent groups are stable electropositive groups may be reacted with ammonium halide in the presence of an acid having an ionization constant above $1 \times 10^{-5}$, say sulfurous acid, to produce linear thenylamine polymers which have hydrogen atoms capable of reacting in alkaline media with further amounts of formaldehyde.

While applicants have no definite proof of the existence of materials having compositions corresponding to the foregoing formulae and while they do not wish to be limited by any theories based thereon, the presence of structures analogous thereto will explain some of the properties of the materials obtained by condensing thiophene, ammonium halide and formaldehyde in the presence of a modifier of the class defined hereinbefore, for example sodium bisulfite.

1. A sulfite or corresponding salt of the amine is formed having a composition which may be represented by the formula $R—CH_2NH \cdot SO_3M$ in which R is thiophene and M is a metal or hydrogen.

2. When M is a hydrogen a "zwitter ion" results to produce a product which may be represented by the formula $RCH_2—N^+H_2CH_2SO_3^-$ where R has the same significance as before.

This compound is produced in the following manner: about 420 parts by weight of thiophene (about 5 moles), about 810 parts by weight of an aqueous 36 per cent formalin solution (about 10 moles) and about 270 parts by weight of ammonium chloride (about 5 moles) were maintained at about 24 to 27 degrees centigrade while passing gaseous sulfur dioxide through the mixture at approximately 400 millimeters per minute. After about one hour, a crystalline material began to form. Fifteen minutes later, the reaction mixture was nearly solid. The mixture was filtered and a white crystalline product obtained. Neutralization of the aqueous filtrate with caustic soda yielded 15 per cent of 2-thenylamine and 34 per cent N-(2-thenyl)formaldimine having a boiling point at a pressure of 3.7 millimeters of mercury of 100 to 121 degrees centigrade, $n_D^{20}$ above 1.595. The crystalline product when recrystallized from water and alcohol, melted at 135 to 136 degrees centigrade and had a neutral equivalent of 216. When this compound was treated with hot aqueous hydrochloric acid, sulfur dioxide was evolved. When sulfur dioxide was bubbled through a sample of authentic N-(2-thenyl)formaldimine ($C_4H_3S—CH_2N=CH_2$) a white crystalline product was obtained having the same melting point (135 to 136 degrees centigrade). A mixed melting point gave no depression. It is believed the product is

$C_4H_3S—CH_2\overset{+}{N}H_2—CH_2SO_3^-$ (neutral equivalent=206). The aqueous reaction layer was neutralized with caustic soda and a white solid material (210 parts by weight) was obtained. When heated above 200 degrees centigrade this material did not melt but turned yellow.

The following examples are illustrative of the use of other materials having at least one hydrogen atom of pronounced reactivity in the place of thiophene in the reaction discussed hereinbefore.

*Example XII*

About 98 parts by weight (about one mole) of 3-methyl-thiophene, about 54 parts by weight of ammonium chloride (about one mole) and about 53 parts by weight of sodium bisulfite (about 0.5 mole) were mixed. To the mixture were added about 162 parts by weight of an aqueous solution containing about 36 per cent formaldehyde (about 2 moles of formaldehyde). The reaction mixture was heated to about 76 degrees centigrade and the reaction temperature maintained at about 74 to 77 degrees centigrade for about one hour. The resultant orange colored solution stratified upon standing at ambient temperatures. Neutralization of a portion of this material with caustic soda gave a light-pink resin. This material imparted water repellency to textile fabrics.

*Example XIII*

About 84 parts by weight of thiophene (about one mole), about 104 parts by weight of sodium bisulfite (about one mole), about 49 parts by weight of ammonium chloride (about 0.9 mole) and about 28 parts by weight of octadecylamine (about 0.1 mole) were mixed and treated with about 10 parts by weight of concentrated hydrochloric acid to convert the octadecylamine to the amine hydrochloride. About 162 parts by weight of aqueous 36 per cent formalin solution (about 2 moles) were added to the foregoing mixture and the entire mixture heated at the reflux temperature (about 68 to 70 degrees centigrade) for one hour. The reaction mixture, upon cooling, crystallized to a white semi-solid mass. Neutralization of the reaction mixture with caustic soda produced a white thermoplastic resin.

*Example XIV*

About 84 parts by weight of thiophene (about one mole), about 131 parts by weight of ethylenediamine dihydrochloride (about one mole), about 162 parts by weight of an aqueous 36 per cent formalin solution (about 2 moles of formaldehyde) and about 100 parts by weight of sodium sulfite (about one mole) were mixed and heated at the reflux temperature (about 68 to 74 degrees centigrade) for about 45 minutes. The resultant reacted mixture was semi-solid and practically white in color. Neutralization of a portion thereof with caustic soda produced a white flocculent resin. This is in contrast to the resin obtained as described in copending application Serial No. 727,300, now U. S. Patent 2,585,652, issued November 20, 1951, which was a brown brittle product.

*Example XV*

About 98 parts by weight of cyclohexanone (about one mole), about 54 parts by weight of ammonium chloride (about one mole) and about 104 parts by weight of sodium bisulfite (about one mole) were mixed. About 162 parts by weight of an aqueous 36 per cent formalin solution (about 2 moles) were added very slowly (dropwise) to the aforesaid mixture. A heat of reaction developed during the addition of the formalin solution and the temperature of the reaction mixture rose to about 52 degrees centigrade. After the temperature began to fall the reaction mixture was heated at about 90 to 97 degrees centigrade for about 2.5 hours. The resultant solution had a pink fluorescent color. Neutralization of a portion of the aqueous mixture produced a light-pink thermoplastic, pliable resin. This is in distinct contrast to the resin prepared in the absence of sodium bisulfite. In the absence of sodium bisulfite the reaction was very difficult to control, i. e. the temperature rose to about 105 degrees centigrade before subsiding, the reaction mixture was a deep brown color and a brittle, hard, thermoset resin was obtained by neutralization with caustic soda.

*Example XVI*

About 43 parts by weight of tertiary butyl-3-thienyl thioether,

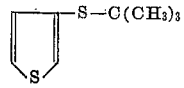

(about 0.25 mole) about 14 parts by weight of ammonium chloride (about 0.25 mole) and about 26 parts by weight of sodium bisulfite (about 0.25 mole) were mixed. About 81 parts by weight of aqueous 36 per cent formalin solution (about one mole of formaldehyde) were added. The reaction mixture was refluxed at about 80 to 85 degrees centigrade for about 8 hours. A portion of the material reacted. The reddish colored aqueous layer on neutralization gave a light-brown resin capable of imparting the property of water-repellency to textile fabrics.

*Example XVII*

About one mole of pyrrole was treated with about 2 moles of ammonium chloride, about one mole of sodium bisulfite and about 3 moles of 36 per cent formaldehyde solution. The temperature rose to 70 degrees centigrade, and was controlled there by means of an ice bath. The reaction mixture was stirred for about one hour. Most of the reaction mixture was soluble in hot water.

*Example XVIII*

About one mole of furan was heated at about 70 degrees centigrade in a stirring autoclave at about 15 to 20 pounds per square inch pressure with about one mole of ammonium chloride, about one mole of sodium bisulfite and about 3 moles of 36 per cent aqueous formaldehyde solution. After 10 minutes the pressure fell to zero, indicating complete reaction of the furan and the heating was continued for about 3 hours. Deposition of this material on fabric in the manner described hereinbefore indicated that water-repellency was imparted to the fabric.

*Example XIX*

About 234 parts by weight of thiophene (about 2.5 moles) and about 46 parts by weight of phenol (about 0.5 mole) were mixed. About 266 parts by weight of ammonium chloride (about 4 moles), about 80 parts by weight of sodium bisulfite (about 0.8 mole) and about 750 parts by weight of an aqueous 36 per cent formalin solution (about 9 moles of formaldehyde) were added to the mixture of thiophene and phenol. The final mixture was heated at reflux for about 2 hours. The resultant reacted mixture was a light-red color which upon neutralization with caustic soda produced a light-brown resin capable of imparting water-repellency to textile fabrics.

*Example XX*

About 94 parts by weight of phenol (about one mole), about 54 parts by weight of ammonium chloride (about one mole), about 104 parts by weight of sodium bisulfite (about one mole), and about 243 parts by weight of an aqueous 36 per cent formalin solution (about 3 moles) were mixed. The reaction mixture was maintained at about 85 to 90 degrees centigrade for about 6 hours. After the first few minutes it was manifest that the phenol was reacting and that the mixture was becoming thicker as the reaction progressed. A whitish-yellow layer formed that was practically insoluble in water. This product contained about 4.43 per cent nitrogen.

The use of sulfur dioxide in the place of sulfites of the metals, such as sodium bisulfite, provides a more flexible procedure. Thus, when the reaction is carried out at about 25 degrees centigrade a white crystalline product identified as

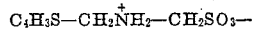

was obtained in good yield. This compound appears to be the basic compound in all of the reactions at different temperatures; however, as the reaction temperature is raised appreciably above 25 degrees centigrade other reactions take place and different products are obtained. Neutralization of the filtrate with caustic soda yields 2-thenylamine and N-(2-thenyl)formaldimine. At 35 degrees centigrade a good yield (62 per cent) of N-(2-thenyl)formaldimine

was obtained. At 45 degrees centigrade a lower yield of N-(2-thenyl)formaldimine was obtained and at 55 degrees centigrade di-(2-thenyl)amine $(C_4H_3S-CH_2)_2NH$ was obtained but no N-(2-thenyl)formaldimine could be isolated. Above 55 degrees centigrade another reaction occurs in which a fair yield (24 to 32 per cent) of thenylamine is obtained together with some di-(2-thenyl)amine.

Illustrative, but not limiting, of the reaction employing thiophene or a derivative of thiophene with at least one unsubstituted alpha nuclear position are the following examples.

*Example XXI*

About 420 parts by weight of thiophene (about 5 moles), about 810 parts by weight of an aqueous 36 per cent formalin solution (about 10 moles) and about 270 parts by weight of ammonium chloride (about 5 moles) were maintained at about 24 to 27 degrees centigrade while passing gaseous sulfur dioxide through the mixture at approximately 400 millimeters per minute. After about one hour, a crystalline material began to form. Fifteen minutes later, the reaction mixture was nearly solid. The mixture was filtered and a white crystalline product obtained. Neutralization of the aqueous filtrate with caustic soda yielded 15 per cent of 2-thenylamine and 34 per cent N-(2-thenyl)formaldimine having a boiling point at a pressure of 3.7 millimeters of mercury of 100 to 121 degrees centigrade, $n_D^{20}$ above 1.595. The crystalline product when recrystallized from water and alcohol, melted at 135 to 136 degrees centigrade and had a neutral equivalent of 216. When this compound was treated with hot aqueous hydrochloric acid, sulfur dioxide was evolved. When sulfur dioxide was bubbled through an aqueous solution at room temperature, said solution containing authentic N-(2-thenyl)formaldimine

a white crystalline product was obtained having the same melting point (135 to 136 degrees centigrade). A mixed melting point gave no depression. It is believed the product is

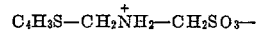

(neutral equivalent=206).

The aqueous reaction layer was neutralized with caustic soda and a white solid material (210 parts by weight) was obtained. When heated above 200 degrees centigrade this material did not melt but turned yellow.

*Example XXII*

About 840 parts by weight of thiophene (about 10 moles), about 1620 parts by weight of an aqueous 36 per cent formalin solution (about 20 moles of formaldehyde) and about 540 parts by weight of ammonium chloride (about 10 moles) were mixed and maintained at about 35 degrees centigrade, while passing gaseous sulfur dioxide therethrough at a rate of about 400 milliliters per minute. After about 2.5 hours all of the thiophene appeared to have reacted. The crystalline product (135 parts by weight) was separated and the yellow aqueous solution neutralized with caustic soda and extracted with benzene. The benzene was removed and the residue distilled at sub-atmospheric pressure. About 469 parts by weight of distillable product, boiling point 114 degrees centigrade at a pressure of 4.5 millimeters of mercury to 146 degrees centigrade at a pressure of 2 millimeters of mercury were obtained. A major portion of this product is N-thenylformaldimine containing 25.8 per cent sulfur. [Calculated for C₄H₃S—CH₂N=CH₂) 25.6 per cent sulfur.]

In a repetition of the foregoing, 782 parts by weight of benzene soluble material was obtained. This material was fractionated under reduced pressure into 5 distillates or cuts and a residue with the following results:

| Cut No. | Pot Temp. | Vapor Temp. | Mm. Press. | Wt. | $n_D^{20}$ |
|---|---|---|---|---|---|
| IBP | 165 | 80 | 4.8 | | |
| 1 | 170 | 114 | 4.5 | 7 | 1.5869 |
| 2 | 178 | 109 | 2.8 | 59 | 1.6073 |
| 3 | 195 | 119 | 2.0 | 138 | 1.6144 |
| 4 | 210 | 135 | 2.0 | 147 | 1.6160 |
| 5 | 220 | 146 | 2.0 | 118 | 1.6162 |
| Residue | | | | 245 | |
| | | | Total | 756 | |

Analyses

| | Per- cent N | Per- cent S | Approx. N to S Ratio |
|---|---|---|---|
| Cut 3 | 9.53 | 25.83 | 1:1 |
| Cut 4 | 9.72 | 26.01 | 1:1 |
| Residue | 9.90 | | |
| Composition before distillation | 10.35 | 24.22 | 1:1 |

Although the major portion of this material is N-(2-thenyl)-formaldimine, oxidation of cut 5 with potassium permanganate in alkaline solution yields 2,5-thiophene dicarboxylic acid, indicative that a compound having the formula

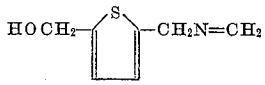

is present in determinable amounts.

Example XXIII

About 84 parts by weight of thiophene (about one mole), about 162 parts by weight of aqueous 36 per cent formaldehyde solution (about 2 moles) and about 54 parts by weight of ammonium chloride were maintained at about 45 degrees centigrade while introducing gaseous sulfur dioxide at a rate such that the temperature of the reaction was maintained at about 45 degrees centigrade without too much difficulty. After about 3 hours, the reaction mixture was yellow in color. Unreacted thiophene was separated from the aqueous layer and about 21 parts by weight of thiophene were recovered. The aqueous layer was neutralized with caustic soda and extracted with benzene. The benzene was removed by distillation and the residue was distilled under reduced pressure. About 23 parts by weight of a distillable product was obtained. The distillate had a boiling range of 105 to 125 degrees centigrade at 1.5 millimeters of mercury. The product was N-thenylformaldimine.

Example XXIV

About 84 parts by weight of thiophene (about one mole), about 162 parts by weight of an aqueous 36 per cent formaldehyde solution (about 2 moles) and about 54 parts by weight of ammonium chloride (about one mole) were maintained at about 55 degrees centigrade, while introducing gaseous sulfur dioxide at a rate such that no great difficulty was encountered in maintaining the temperature of the reaction mixture at about 55 degrees centigrade. After about 3 hours the solution was light orange in color. About 22 parts by weight of unreacted thiophene were separated from the aqueous layer. The aqueous layer was neutralized with caustic soda and extracted with benzene. The benzene was removed and the residue distilled under reduced pressure whereby about 28 parts by weight of distillable product was recovered. Of the foregoing product, about 25 parts by weight were di-(2-thenyl)amine

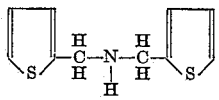

having a boiling range of 155 to 168 degrees centigrade at 3 millimeters of mercury.

Example XXV

About 84 parts by weight of thiophene (about one mole), about 162 parts by weight of an aqueous 36 per cent formaldehyde solution (about 2 moles) and about 54 parts by weight of ammonium chloride (about one mole) were maintained at about 65 degrees centigrade while introducing gaseous sulfur dioxide at a rate which did not make maintenance of the temperature too difficult. After about 3 hours the reaction mixture was orange in color. About one gram of unreacted thiophene was separated from the aqueous layer. The aqueous layer was neutralized with caustic soda (any other suitable alkaline material could have been used) and the neutralized mixture extracted with benzene. The benzene was removed and the residue was distilled under reduced pressure. About 33 parts by weight of distillable products were recovered. The distillate had a boiling range of 43 to 143 degrees centigrade at a pressure of 1 to 2 millimeters; about 60 per cent of the distillate was 2-thenylamine

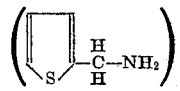

Example XXVI

About 210 parts by weight of thiophene (about 2.5 moles), about 162 parts by weight of an aqueous 36 per cent formaldehyde solution (about 2 moles) and about 162 parts by weight of ammonium chloride (about 3 moles) were heated to reflux and gaseous sulfur dioxide introduced at a rate of about 400 milliliters per minute. After about one hour about 95 parts by weight of unreacted thiophene were removed by steam distillation and the residual aqueous solution neutralized with caustic soda and extracted with benzene. The benzene was removed and the residue distilled under reduced pressure. About 52 parts by weight of a distillable product having a boiling range of 47 to 143 degrees centigrade at 2 to 3 millimeters of mercury were recovered. About 61.5 per cent of the distillate was 2-thenylamine

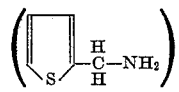

Example XXVII

A mixture of about 84 parts by weight of thiophene (about one mole) about 162 parts by weight of an aqueous 36 per cent formaldehyde solution (about 2 moles), about 54 parts by weight of ammonium chloride (about one mole) and about 115 parts by weight of 85 per cent orthophosphoric acid (about one mole) were warmed at 35 degrees centigrade for about 3.5 hours. From gross observations the reaction proceeded in all respects similarly to the sulfur dioxide reactions described hereinbefore and was worked up in a similar manner. Distillation of the benzene-soluble amine yielded 23 parts by weight of N-(2-thenyl)formaldimine boiling point 123 degrees centigrade at a pressure of 2 millimeters of mercury and about 46 parts by weight of polymerized residue.

Phosphoric acid yields a crystalline addition product with N-(2-thenyl)formaldimine similar to the addition product obtained with sulfurous acid.

*Example XXVIII*

About 168 parts by weight of thiophene (about 2 moles), about 70 parts by weight of hydroxylamine (about one mole), and about 104 parts by weight of sodium bisulfite (about one mole) were mixed. About 162 parts by weight of an aqueous 36 per cent formaldehyde solution (about 2 moles) were added to the mixture thus formed with external cooling. The temperature of the mixture rose to about 50 degrees centigrade in spite of the external cooling. After the heat of reaction had subsided, the mixture was warmed to about 72 degrees centigrade at which temperature reflux again became vigorous. After refluxing subsided (which required about 10 to 15 minutes), the pale yellow solution was cooled, diluted with water to a working solution and deposited on cotton poplin to produce a water-proofed textile.

It will be manifest to those skilled in the art that the foregoing is a detailed description of the reaction between materials having at least one hydrogen atom of pronounced activity, formaldehyde and a hydrohalide of ammonia or alkyl or hydroxyl substituted ammonia in the presence of acids having ionization constants above $1 \times 10^{-5}$ such as acetic acid, arsenic acid, benzoic acid, haloalkanoic acids, citric acid, formic acid, fumaric acid, maleic acid, and sulfurous acid.

We claim:

1. A method for producing N-(2-thenyl)formaldimine, 2-thenylamine and a sulfurous acid addition compound of N-(2-thenyl)formaldimine which comprises mixing thiophene, aqueous formaldehyde and ammonium chloride in the molar proportion of 1:2:1 and passing aqueous sulfur dioxide into the mixture whilst maintaining a temperature of about 25 degrees centigrade until at least crystalline material begins to form, separating the crystalline material from the reaction mixture, and neutralizing the aqueous filtrate with caustic soda, whereby

is obtained as the crystalline product and N-(2-thenyl)formaldimine and 2-thenylamine are obtained from the aqueous liquors.

2. A method for producing N-(2-thenyl)formaldimine which comprises mixing thiophene, aqueous formaldehyde and ammonium chloride in the proportion of 1:2:1 and passing gaseous sulfur dioxide through the mixture whilst maintaining a temperature of about 35 to about 45 degrees centigrade until a crystalline product is produced, separating the crystalline product from the aqueous solution, neutralizing the aqueous solution, extracting the neutralized aqueous solution with an organic solvent for N-(2-thenyl)formaldimine, fractionating the extract to obtain a distillate having a boiling range of 114 degrees centigrade at a pressure of 4.5 millimeters of mercury to 146 degrees centigrade at a pressure of 2 millimeters of mercury containing N-(2-thenyl)formaldimine.

3. A method of producing di-(2-thenyl)amine which comprises reacting at 55 degrees centigrade thiophene, ammonium halide, formaldehyde and an acid having an ionization constant above $1 \times 10^{-5}$ but not greater than about $1.7 \times 10^{-2}$ and recovering di-(2-thenyl)amine.

4. A method of producing thenylamine which comprises reacting at above 55 degree centigrade to the reflux temperature, thiophene, ammonium halide, formaldehyde and an acid having an ionization constant above $1 \times 10^{-5}$ but not greater than about $1.7 \times 10^{-2}$ and separating thenylamine.

5. The method described and set forth in claim 4 in which the acids having an ionization constant above $1 \times 10^{-5}$ but not greater than about $1.7 \times 10^{-2}$ is sulfurous acid.

6. The method described and set forth in claim 3 and in which the acid having an ionization constant above $1 \times 10^{-5}$ but not greater than about $1.7 \times 10^{-2}$ is sulfurous acid.

7. As a new product, a compound having a structure conforming to the formula

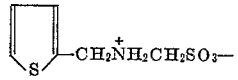

having a melting point of 135 to 136 degrees centigrade and evolving sulfur dioxide when treated with hot aqueous hydrochloric acid.

JOHN W. SCHICK.
HOWARD D. HARTOUGH.

REFERENCES CITED

The following references are of record in the file of this patent:

UNITED STATES PATENTS

| Number | Name | Date |
| --- | --- | --- |
| 2,453,085 | Caesar | Nov. 2, 1948 |
| 2,453,086 | Caesar | Nov. 2, 1948 |

FOREIGN PATENTS

| Number | Country | Date |
| --- | --- | --- |
| 51,629 | Netherlands | Dec. 15, 1941 |

OTHER REFERENCES

Levvy, J. Chem. Soc. (London), 1938, 1053–1056.

Hartough, J. Am. Chem. Soc. 69, 1355–1358, June 1947.

Bliche, "The Mannich Reaction," Organic Reactions, vol. 1, pp. 304–305, Wiley, New York, 1942.

Holdren, J. Am. Chem. Soc. 68, 1198–1200 (1946).

Morton, "The Chemistry of Heterocyclic Compounds," pp. 42–43, McGraw-Hill, New York, 1946.

Hartough, J. Am. Chem. Soc., 70, 4013 (1948).